United States Patent [19]

Sjardijn et al.

[11] Patent Number: 5,109,073
[45] Date of Patent: Apr. 28, 1992

[54] PROCESS FOR THE PREPARATION OF POLYMER BLENDS

[75] Inventors: Willem Sjardijn; Johannes J. M. Snel, both of Amsterdam, Netherlands

[73] Assignee: Shell Oil Company, Houston, Tex.

[21] Appl. No.: 439,309

[22] Filed: Nov. 21, 1989

[30] Foreign Application Priority Data

Nov. 23, 1988 [GB] United Kingdom ............... 8827320

[51] Int. Cl.$^5$ ................ C08F 279/00; C08F 283/14; C08F 2/02; C08L 45/00
[52] U.S. Cl. ................... 525/290; 525/210; 525/211; 526/73; 526/86; 526/90; 526/150; 526/183
[58] Field of Search ............ 525/210, 211, 290; 526/73, 90, 150, 183, 86

[56] References Cited

U.S. PATENT DOCUMENTS

| | | | |
|---|---|---|---|
| 3,449,310 | 6/1969 | Dall'Asta et al. | 260/93.1 |
| 4,020,254 | 4/1977 | Ofstead | 526/128 |
| 4,469,809 | 9/1984 | Klosiewicz | 502/117 |
| 4,481,344 | 11/1984 | Newburg | 526/283 |
| 4,810,762 | 3/1989 | Sjardijn et al. | 526/166 |

FOREIGN PATENT DOCUMENTS

| | | |
|---|---|---|
| 1954829 | 5/1971 | Fed. Rep. of Germany . |
| 63-128016 | 5/1988 | Japan . |
| 2005280 | 4/1979 | United Kingdom . |

Primary Examiner—John C. Bleutge
Assistant Examiner—Vasu S. Jagannathan

[57] ABSTRACT

A process for preparing a blend of a norbornene polymer and a vinyl polymer, the process comprising (a) injecting into a mold a reaction mixture comprising from about 30 to about 70 weight percent, based on the total monomer weight, of at least one substituted or unsubstituted norbornene monomer, from about 70 to about 30 weight percent of at least one polymerizable monomer, a metathesis catalyst system comprising a transition metal catalyst and a cocatalyst, and a free radical initiator, and (b) subjecting the reaction mixture to temperature conditions to sequentially initiate polymerization of the norbornene monomer and the vinyl monomer.

20 Claims, No Drawings

PROCESS FOR THE PREPARATION OF POLYMER BLENDS

BACKGROUND OF THE INVENTION

This invention relates to a process for the in-situ preparation of polymer blends of ethylenically unsaturated monomers which are polymerized with different catalyst systems.

It is known from published Dutch patent application No. 6601466 to use a peroxide in a metathesis-catalyst system. According to the disclosed process, the active catalyst species (a metal carbene) is formed by the combination of tungsten hexachloride, a peroxide in a 1:1 molar ratio, and a metal alkyl activator. According to this disclosure, the introduction of oxygen is essential for the formation of an active metal carbene species (spectator oxygen effect).

German published patent application No. 1954829 discloses the radical polymerization of styrene in the presence of dissolved polycyclopentene. In this publication, reference is made to Dutch patent application No. 6601466 for the preparation of polycyclopentene. According to this process, the polycyclopentene is separately prepared with a metathesis-catalyst system and, after isolation (by means of catalyst decomposition, deashing, drying, etc.), dissolved in styrene, after which the peroxide is introduced.

From published Japanese patent application No. 63128016, a process is known for the preparation of a blend of a ring-opening polymerized body of norbornene derivatives, which is immersed with vinyl aromatic monomer, whereafter said vinyl aromatic monomer is polymerized in aqueous suspension using a radical polymerization initiator. The norbornene derivative, having a polar radical, preferably should have a specific structure, whereas the vinyl aromatic monomer is preferably styrene, methyl styrene, ethyl styrene, and the like, and the radical polymerization initiator is an oil-soluble type.

Polymer blends obtainable by the processes as disclosed in the above-discussed patent publications lack the properties necessary for high-performance polymer applications.

It is therefore an object of the invention to provide an improved and economical manufacturing process for the sequential polymerization of at least two monomers by two different mechanisms. A further object of the invention is to provide improved polymer blends derived from monomer mixtures.

BRIEF SUMMARY OF THE INVENTION

According to the invention, a process for in-mold preparation of a polymer blend is provided, the process comprising (a) injecting into a mold a reaction mixture comprising a substituted or unsubstituted norbornene monomer, a vinyl monomer, a metathesis catalyst system comprising a transition metal catalyst and cocatalyst, and a free radical initiator and (b) subjecting the reaction mixture to temperature conditions to sequentially initiate polymerization of the norbornene monomer and the vinyl monomer.

DETAILED DESCRIPTION OF THE INVENTION

Preferably the monomer to be polymerized by means of a metathesis ring-opening catalyst system is a norbornene derivative, most preferably dicyclopentadiene (DCPD), whereas the vinyl monomer to be polymerized by means of a free radical forming catalyst system may be any radically polymerizable ethylenically unsaturated monomer such as a mono-alkenyl aromatic, and more particularly styrene, acrylate esters, e.g., methyl methacrylate, or mixtures of a mono-alkenyl aromatic and an acrylate ester.

It will be appreciated that the sequence of the polymerization mechanisms can be varied. For example, depending on the specific circumstances and properties of the desired final product, the heat generated by the exothermic radical polymerization may be used to trigger the metathesis polymerization of the norbornene derivative, and vice versa.

The polymerization of norbornene derivatives by means of metathesis ring-opening polymerization catalysts is known from, for example, U.S. Pat. No. 4,020,254, U.S. Pat. No. 4,481,344, British patent application No. 2,005,280, European patent specification No. 0084888 and European patent application No. 0222432.

It will be appreciated that any of the disclosed catalyst systems of the above-mentioned patent publications may be used for the process of the present invention, depending on the finally desired properties of the polymer blend to be prepared. Preferred ring-opening metathesis-catalyst systems for the polymerization of norbornene derivatives are those described in British patent application No. 2,005,280 and European patent application No. 0222432. More preferably, a ring-opening metathesis-catalyst system is used which comprises (i) a tungsten compound containing a phenyl group carrying a bulky alkyl group and (ii) an organic tin hydride containing one hydrogen atom bound to the tin atom, and/or an organic silicon hydride containing at least one hydrogen atom bound to the silicon atom.

An advantageous characteristic of the process of the invention is the presence of both catalysts in the starting reaction mixture, which are consecutively used for a metathesis ring-opening mechanism and a radical initiator polymerization mechanism as, for example, occurs if the second monomer is polymerized in the swollen polymer gel formed by a cross-linked polymer network of, e.g., polydicyclopentadiene or polynorbornene.

The tungsten halide for the preparation of component (i) may be a bromide or fluoride, but is preferably a chloride and more preferably tungsten hexachloride. Another example of the tungsten chloride is tungsten oxytetrachloride ($WOCl_4$).

The phenol to be used for preparation of component (i) could be substituted with a bulky alkyl group at the position ortho with respect to the hydroxyl group. On the other hand, the phenol may be a monocyclic halophenol in which the halogen atoms are attached to the aromatic nucleus. Among such halophenols, fluorophenols are preferred, but chlorophenols and bromophenols may be used.

Another preferred group of phenols for preparation of catalyst component (i) are those monocyclic phenols having a trihalomethyl substituent attached to the aromatic nucleus. The trihalomethyl substituent is preferably a trifluoromethyl group, but may also be a trichloromethyl or tribromomethyl group. Examples of such phenols are 2-trichloromethylphenol, 4-trifluoromethylphenol, 2-trifluoromethylphenol, 3-chlorodifluoromethylphenol, 3-dichlorofluoromethylphenol and 3-tribromomethylphenol.

Component (i) may be prepared in the presence of a suitable solvent. Examples of such solvents are cyclopentane, cyclohexane, benzene, toluene, o-, m- and p-xylene. chlorobenzene and 1,2-dichlorobenzene. It is preferred, however, that component (i) be dissolved in one or more of the monomers to be polymerized.

Suitably, a molar ratio of phenol to tungsten in the range of from about 1:1 to 10:1, preferably about 1:1 to 3:1, is used. The preparation of component (i) can be effected by suspending a tungsten halide in the solvent and adding the phenol to the suspension formed, stirring the reaction mixture and blowing a stream of dry inert gas such as nitrogen through the mixture to remove the hydrogen halide formed.

Component (ii) is preferably a tin compound and/or a silicon compound according to the general formula I

in which Q represent Sn or Si, R¹ and R² may each represent hydrogen, and R¹, R² and R³ may represent an optionally substituted alkyl group having in the range of from 1 to 20 carbon atoms, an optionally substituted cycloalkyl group having in the range of from 3 to 6 carbon atoms in the cycloalkyl ring, or an optionally substituted phenyl group.

Depending on the type of the phenol compound to be used for the preparation of component (i), a compound according to formula I may be used wherein Q represents tin and/or a compound wherein Q represents silicon, or mixtures of those compounds.

Examples of suitable tin compounds are tributyltinhydride, tripropyltinhydride, tripentyltinhydride, trioctyltinhydride. methyldicyclohexyltinhydride, triphenyltinhydride, phenyldimethyltinhydride, and cyclopentyldimethyltinhydride, of which tributyltinhydride is preferred.

Examples of suitable silicon compounds are dibutylsilane, triethylsiliane, trihexylsilane, dipropylsilane, dipentylsilane, diphenylsilane, dicyclohexylsilane, dicylopentylsilane and dioctylsilane.

Examples of substituents of R¹, R² and R³ are alkoxy groups having in the range of from 1 to 20 carbon atoms and fluorine or chlorine atoms.

The polymerization step using the ring-opening metathesis catalyst system is usually carried out at an average polymerization temperature in the range of from 50° to 200° C.

The ring-opening metathesis polymerization step of the process according to the invention can be carried out at a molar ratio between the tungsten compound and the norbornene derivatives and a molar ratio of tin and/or silicon compound to tungsten which may vary within wide ranges. Preferably the former ratio is in the range of from about 1:10,000 to 1:100, preferably about 1:1000 to 1:5000, and the latter ratio is in the range of from about 15:1 to 1:1, preferably about 12:1 to 3:1.

For the process of the invention a technical grade of norbornene derivatives and more particularly of dicyclopentadiene (DCPD) may be used which may contain impurities distilling below a top temperature of 100° C. at a pressure of 12,400±400 Pa. Such impurities usually form azeotropic mixtures with e.g. DCPD. The technical grade may contain, for example, at least 83% by weight of pure DCPD. An advantage of the use of such technical grades is that they are usually liquid at ambient temperature, say at 20° C.; pure endo-DCPD has a melting point of 32° C. Commercially, the DCPD to be used for the present invention is usually available in the endo form but, if desired, the exo form or mixtures of the endo and exo form may be used. The technical grade of DCPD is preferably obtained by dimerization of a technical grade of cyclopentadiene, which, in turn, is obtained by fractional distillation of the products obtained by cracking of hydrocarbons, for example a naphtha fraction, in the presence of steam.

Polymerization by means of radical-providing catalyst systems may be carried out with a great variety of radical-providing catalysts as disclosed in, for example, U.S. Pat. Nos. 3,649,614; 3,726,846; 3,726,848; 3,817,965; 3,965,145 and 4,125,695.

The free radical polymerization of one of the monomer components of the starting monomer mixture, e.g., vinyl aromatic monomers or acrylic acid esters, may be carried out by applying different temperature profiles during the course of the polymerization. The temperature during this polymerization step may be step-wise or progressively increased by at least 30° C. during the period of the polymerization, whereas the final temperature is at least 110° C. It will be appreciated that during the free radical polymerization step, one or more free radical forming catalysts may be used.

Examples of suitable free radical forming polymerization catalysts are cyclohexanone peroxide, t-butylperoxybenzoate, azo-bis-isobutyronitrile, benzoylperoxide, methylethylketone peroxide, dicumylperoxide, di-t-butylperoxide, 2,5-dimethyl-2,5-dibenzoylperoxyhexane, and di-t-butyldiperoxyphthalate, of which dicumylperoxide is preferred.

Examples of suitable vinyl aromatic monomers are styrene, ring substituted styrenes like methylstyrene, dimethylstyrene, ethylstyrene. isopropylstyrene and chlorostyrene and α-substituted styrenes like α-methylstyrene, α-ethylstyrene, and divinylbenzene and the like. Styrene is preferred.

Examples of suitable acrylate esters are methyl methacrylate, methyl acrylate, butyl methacrylate and butyl acrylate, of which methyl methacrylate is preferred.

According to a preferred embodiment of the invention process, at least two free radical forming polymerization catalysts are used, and the temperature of this polymerization is progressively increased within a temperature range of from about 90° to 200° C., most preferably in the range of from about 100° C. to 170° C.

The weight ratio between the monomers in the starting mixture may in principle vary within relatively wide ranges, but preferably a weight ratio between the norbornene derivative and the monomer to be polymerized by free radical initiation will be within the range of about 30:70 to 70:30, preferably within the range of about 40:60 to 60:40.

The molar ratio between both catalyst systems may vary in principle in a wide range, but is preferably in the range of from about 1:35 to 1:2, preferably about 1:10 to 1:5 expressed as moles of tungsten compound/moles of free radical-providing catalyst, and more particularly moles of peroxide catalyst.

According to a preferred embodiment of the process of the invention, the polymerization of the norbornene derivative is carried out by contacting a stream of the metathesis ring-opening catalyst component (i) with a stream of the catalyst component (ii) prior to the polymerization, at least one of the streams having been admixed with the norbornene derivative, alone or admixed with the other monomer, as solvent.

For example, it is possible to dissolve the catalyst component (i) in the norbornene derivative admixed with, e.g., styrene and either to dissolve component (ii) in the norborne derivative or in styrene as solvent or to use the activator component (ii) without any solvent. The free radical providing catalyst system may be included in one or both of the norbornene derivative-containing streams. Preferably the free radical providing catalyst system is included in the stream containing component (ii) of the metathesis ring-opening catalyst.

After contact of the streams with each other, the resulting mixture is preferably injected or poured into a mold where polymerization of the norbornene derivative and vinyl monomer takes place. Preferably, the resulting polymer blend is subjected to a post-cure treatment at a temperature of at least about 110° C. for an hour or more.

It will be appreciated that the process according to the invention may be carried out in the presence of additional auxiliary materials such as fillers, fibers, antioxidants, tougheners, stabilizers, pigments and plasticizers.

By using the mixed catalyst systems for the process of the invention, it is specifically of interest for injection molding or casting. Because of the low viscosity of the monomers/catalysts systems mixture, polymerization is very suitable for large castings with intricate molds.

A significant advantage of the process of the present invention is that quantitative polymerization can be reached for both monomer components due to which the final polymer blend is substantially free from the norbornene derivative monomer as well as the monomer to be polymerized by free radical initiation. For this reason, the final polymer blend is free from odor and can be used for a large number of applications, for example (a) structural composites in the automative industry and (b) application in the electrical industry, for example in printed circuit boards.

It will be appreciated that the reaction streams as specified above containing components (i) and (ii) of the complete ring-opening metathesis polymerization catalyst system may be prepared just before the main polymerization reactions or may be prepared a longer time in advance and may be stored for a longer period as stock solutions. In this connection it is required that the norbornene derivatives do not contain more than a few parts per million (ppm) by weight of water.

It will be appreciated that the complete reaction mixtures, or parts thereof, to be used for the process of the present invention form an additional feature of the present invention. More particularly, the invention includes reaction stream compositions comprising at least a ring-opening metathesis catalyst component (1) or (2), a norbornene derivative and a monomer to be polymerized by free radical initiation, optionally mixed with a free radical forming polymerization catalyst. More preferably such reaction stream compositions comprise a ring-opening metathesis catalyst component (i) derived from tungsten hexachloride and a substituted phenol or tributyltinhydride and/or a silane as metathesis catalyst component (ii), DCPD, styrene or methyl methacrylate, optionally mixed with a peroxide catalyst.

The following Examples further illustrate the invention.

The used starting DCPD was a technical grade having an initial boiling point of 90° C. and of which 3.0% was distilled over at a temperature of 100° C. and a pressure of 12,000 Pa, the distillation being carried out in a column having 14 theoretical trays. The DCPD was dried by contacting with a 4A molecular sieve until it contained less than 1 part per million by weight of water. The DCPD contained (% by weight) 3.5% isopropenyl-2-norbornene, 1.1% 5-cis and trans-1-propenyl-2-norbornene, and 0.7% 5-methyltetrahydroindene.

For each of the Examples and the Comparative Experiments the preparation of the catalytic systems is described hereinafter.

EXAMPLE 1

Polymerization of Norbornene in Styrene

Preparation of the metathesis catalyst: An amount of 50 mmol $WCl_6$ was suspended in dried toluene (40 ml) under a dry nitrogen blanket. Diisopropylphenol (5.5 mmol) in toluene (20 ml) was added. After completion of the reaction, the catalyst component (DIPC) was isolated by evaporation of the solvent.

In a dried serum cap bottle and under nitrogen, 34 mg (0.05 mmol) of the catalyst component obtained above (DIPC) and 135 mg of dicumylperoxide (0.5 mmol) were introduced. Subsequently 20 ml of a norbornene/styrene mixture were added in a weight ratio of 50:50. The catalyst components were dissolved in the polymerization mixture. The mixture was cooled to 0° C. on an ice bath and 135 µl tributyltin hydride was added.

The mixture was taken from the ice bath and the temperature was slowly increased. From 10° C. a temperature jump was detected until about 90° C. The reaction mixture was then slowly heated further, until at about 120° C. a second temperature jump was detected to 200° C.

Heating of the resulting polymer mixture was continued over about three hours at 130° C.

EXAMPLE 2

Polymerization of Styrene/Dicyclopentadiene (DCPD)

An amount of 50 mg (0.07 mmol) DIPC as obtained in Example 1 and 81 mg of dicumylperoxide (0.3 mmol) were introduced into a dried serum cap bottle.

20 ml of a mixture of DCPD/styrene, containing 75% by weight of DCPD and 25% by weight of styrene was added. The solution was cooled on an ice bath and before 375 µl tributyltinhydride (1.4 mmol) was added. The mixture was slowly warmed to room temperature, without an exothermic reaction, but with gelation of the reaction mixture.

The polymerization mixture was heated in a bath of 90° C., and an exothermic reaction took place, as indicated by a detected temperature jump from 45° C. to 210° C. Thereafter post-curing was continued for three hours at about 130° C.

EXAMPLE 3

Polymerization of DCPD and Methyl Methacrylate

In a dried serum cap bottle, 49 mg DIPC (0.07 mmol) and 80 mg dicumylperoxide (0.3 mmol) were weighed out under nitrogen. To this mixture, 14 ml DCPD and 6 ml methyl methacrylate (MMA) were added.

The catalysts were dissolved in the polymerization mixture, which was cooled to about 5° C. At this temperature, 375 μl tributyltinhydride (1.4 mmol) was added and the mixture was placed in an oil bath of 90° C. After about 3 minutes, the temperature jumped from 15° C. to 145° C. Thereafter the temperature decreased and the mixture was placed in an oil bath of 130° C. A second gradual temperature jump to $T_{max}$ of 170° C. occurred.

Subsequently the mixture was additionally cured at 130° C. for about two hours.

We claim:

1. A process for in-mold preparation of a polymer blend comprising:
   injecting into a mold a reaction mixture comprising from about 30 to about 70 weight percent, based on the total monomer weight, of at least one substituted or unsubstituted norbornene monomer, from about 70 to about 30 weight percent of at least one vinyl monomer selected from the group consisting of vinyl aromatic monomers and acrylic acid esters, a metathesis catalyst system comprising a transition metal catalyst and a cocatalyst, and a free radical initiator;
   subjecting said reaction mixture to a temperature effective to initiate metathesis polymerization of the norbornene monomer;
   subsequently, subjecting said reaction mixture to an elevated temperature of at least 110° C. effective for free radical polymerization of the vinyl monomer, thereby producing a molded part comprising a blend of a norbornene polymer and a free radical-initiated polymer.

2. The process of claim 1 in which the norbornene monomer is dicyclopentadiene.

3. The process of claim 1 in which the norbornene monomer is norbornene.

4. The process of claim 1 in which the vinyl monomer is a mono-alkenyl aromatic monomer.

5. The process of claim 2 in which the vinyl monomer is styrene.

6. The process of claim 2 in which the vinyl monomer is an acrylate ester.

7. The process of claim 2 in which the vinyl monomer is a mixture of acrylate ester and mono-alkenyl aromatic monomers.

8. The process of claim 6 in which the acrylate ester is methyl methacrylate.

9. The process of claim 1 in which the metathesis catalyst system comprises (i) a tungsten compound containing a phenyl group carrying a bulky alkyl group and (ii) a cocatalyst comprising an organic tin compound containing one hydrogen atom bound to the tin atom and/or an organic silicon compound containing at least one hydrogen atom bound to the silicon atom.

10. The process of claim 9 in which the tungsten compound is tungsten hexachloride.

11. The process of claim 10 in which catalyst component (i) is derived from a tungsten compound and a phenol having a trihalomethyl substituent to the aromatic nucleus.

12. The process of claim 11 in which the phenol component is selected from the group consisting of 2-trichloromethylphenol, 4-trifluoromethylphenol, 2-trifluoromethylphenol, 3-chlorodifluoromethylphenol, 3-dichlorofluoromethylphenol and 3-tribromomethylphenol.

13. The process of claim 9 in which the molar ratio of phenol to tungsten is within the range of from about 1:1 to 3:1.

14. The process of claim 9 in which component (ii) is selected from the group consisting of tributyl tin hydride, tripropyl tin hydride and triphenyl tin hydride.

15. The process of claim 14 in which component (ii) is tributyltinhydride.

16. The process of claim 9 in which the molar ratio of the tungsten compound to the norbornene derivative is within the range of about 1:10,000 to 1:100.

17. The process of claim 9 in which the ring-opening metathesis polymerization step is carried out at a molar ratio of tin and/or silicon compound to tungsten in the range of from 15:1 to 1:1.

18. The process of claim 9 in which the free radical polymerization step is carried out in the presence of at least two free radical forming polymerization catalysts.

19. The process of claim 9 in which the temperature of the free radical polymerization step is progressively increased within a temperature range of from about 100° to 170° C.

20. The process of claim 9 which further comprises heating the thus-formed polymer blend at a temperature of at least 100° C. for at least one hour.

* * * * *